United States Patent [19]

Herziger et al.

[11] Patent Number: 4,839,493
[45] Date of Patent: Jun. 13, 1989

[54] ARRANGEMENT FOR MACHINING WORKPIECES BY MEANS OF A LASER BEAM BY BUILDING UP A PLASMA THAT IS TO BE KEPT WITHIN LIMITS

[75] Inventors: Gerd Herziger, Fasanenweg 2, 6101 Rossdorf; Eckhard Beyer, Alsbach; Peter Loosen, Mainz; Reinhart Poprawe, Königstein, all of Fed. Rep. of Germany

[73] Assignee: Gerd Herziger, Rossdorf, Fed. Rep. of Germany

[21] Appl. No.: 862,235

[22] PCT Filed: Jul. 5, 1985

[86] PCT No.: PCT/EP85/00328
§ 371 Date: Apr. 17, 1986
§ 102(e) Date: Apr. 17, 1986

[87] PCT Pub. No.: WO86/00552
PCT Pub. Date: Jan. 30, 1986

[30] Foreign Application Priority Data
Jul. 6, 1984 [DE] Fed. Rep. of Germany ....... 3424825

[51] Int. Cl.[4] .............................................. B23K 26/00

[52] U.S. Cl. ........................... 219/121.69; 219/121.85; 219/121.62

[58] Field of Search ..... 219/121 L, 121 LM, 121 LB, 219/121 LA, 121 LZ, 121 LC, 121 LD, 121 LG, 121 LN, 121 LH, 121 LJ, 121.6, 121.85, 121.62, 121.61, 121.83, 121.63, 121.64, 121.67, 121.72, 121.68, 121.69

[56] References Cited
U.S. PATENT DOCUMENTS 3,700,850 10/1972 Lumley et al. ............ 219/121 LB X
4,121,087 10/1978 Malmuth et al. .............. 219/121 LB
4,504,727  3/1985 Melcher et al. ............... 219/121 LB
4,507,536  3/1985 Inoue ............................ 219/121 LB Primary Examiner—C. L. Albritton
Attorney, Agent, or Firm—Barnes & Thornburg

[57] ABSTRACT

In machining a workpiece, maximal absorption of laser irradiation in the workpiece is achieved by a minimal interference by optical back-coupling and plasma effects is achieved by continuously determining the actual value of the laser irradiation and continuously sensing stochastic processes taking place in the machining zone and in response to such measuring and sensing, controlling the modulation of laser irradiation.

11 Claims, 4 Drawing Sheets $P = 8kW \quad I \approx 4 \cdot 10^6 \, Wcm^{-2} \quad v = 60 \, mm/s$ $P = 2kW \quad I \approx 6 \cdot 10^6 \, Wcm^{-2} \quad v = 20 \, mm/s$ $P = 2kW \quad I \approx 10^6 \, Wcm^{-2} \quad v = 60 \, mm/s$

ARRANGEMENT FOR MACHINING WORKPIECES BY MEANS OF A LASER BEAM BY BUILDING UP A PLASMA THAT IS TO BE KEPT WITHIN LIMITS

TECHNICAL FIELD

This invention relates to an method and apparatus for machining workpieces by means of a laser beam.

In the case of this type of machining of workpieces, the laser irradiation, by means of an optical system, is focussed on the workpiece and absorbed at its surface. The resulting heat is used as process heat for the various machining processes.

STATE OF THE ART

When work is carried out in the range of low intensity of laser irradiation, only the natural absorption of the workpiece is utilized. Since only a small part of the laser energy used in this case is transformed into process heat and the largest part is lost because of heat conduction and reflection (in the case of metals) or transmission (in the case of nonconductors), only low efficiency is obtained.

It is known to apply, for the purpose of increasing absorption, onto the workpiece to be machined a layer having a high degree of absorption. This alternative is used mainly in the case of transformation hardening.

It is also known that the degree of absorption, when the laser intensity $I_L$ is increased to or above a critical limiting value $I_C$, approaches 1. This intensity dependence of the absorption that is also called an abnormal absorption is connected with the development of a laser-induced plasma on the surface of the workpiece. This plasma acts like an energy converter that converts the incident laser energy, in the case of a high efficiency, into heat energy. In the case of removing machining, the material to be removed, by means of the controlling of the intensity of the laser irradiation, can be changed into such a plasma condition in which the kinetic energy of the particles causes a sufficiently fast material transport.

The efficiency $\eta$ of a removing machining may be shown as a function of the relative laser intensity $I_L/I_C$ in the case of a wave length $\lambda = 10.6$ $\mu$m, for rustproof steel and for cooper. It is found that in the range of the critical intensity $I_C$, the efficiency $\eta$ comes close to the value 1.

In the case of a further increase of the laser intensity, a noticeable shielding of the workpiece occurs by means of heating and ionization of the plasma expanding in the direction of the incident laser irradiation. Also the lens effect of the plasma increases interfering with the machining geometry. In the case of an exceeding of an upper limiting value of the intensity $I_D$ of the laser irradiation, the plasma almost completely shields the workpiece which results in a laser-induced detonation wave in which case the recoil of the expanding plasma may result in cavitation and destruction of the surface of the workpiece because of stress caused by pressure.

The prerequisite of the formation of a laser-induced plasma at the surface of the workpiece is the presence of a gaseous state of aggregation of the material of the workpiece. In order to meet this requirement, the laser beam must first heat the workpiece to or above the evaporation temperature. This means that more laser energy must be absorbed by the workpiece than is removed by heat conduction. On the basis of a varying heat conduction and absorption, typical evaporation critical intensities of the laser irradiation are obtained for the different materials.

One difficulty in the case of the machining of workpieces by means of laser beams in the area of abnormal absorption is the fact that the formation of a laser-induced detonation wave may start immediately after the beginning of the evaporation process. This may, among other things, also occur during the machining of aluminum by means of $CO_2$—laser.

Another difficulty is the result of the fact that the laser by the machining process is changed in its system characteristics. By means of the arrangement of the workpiece in the focal plane of the optical system, a fraction of the laser irradiation is reflected into the laser resonator. This resonator, together with the workpiece, forms a system of coupled resonators, the characteristics and modes of which are clearly different from those of the original laser resonator. Since the processes on the workpiece, especially the characteristics of a laser-induced plasma and the dynamics of the melted material, by means of this optical back-coupling, stochastically influence the characteristics of the laser, a control of the intensity in order to avoid the detonation wave condition and thus a controlling of the laser intensity is not possible. Also a suppression of the back-coupling by means of economically operating reaction-blocking means is currently not possible in the high-capacity range.

DESCRIPTION OF THE INVENTION

This invention is based on the objective of making possible a machining of workpieces by means of laser beams where a maximal absorption of the laser irradiation in the workpiece is achieved with a minimal interference by optical back-coupling and plasma effects.

It is therefore an object of the invention to provide an arrangement for machining workpieces by means of the laser beam by building up a plasma that is to be kept within limits, wherein the laser intensity $I_L$ is kept in the range $I_C \geq I_L < I_D$ by generating signals when indicated threshold values are exceeded or fallen below, the signals being used for controlling or regulating the laser intensity $I_L$ and wherein the laser intensity fluctuates within the bandwidth by critical values $I_C$ and $I_D$, while continuously sensing and taking into account the stochastically influenced processes in the machining zone of the workpiece, by means of a corresponding modulation of laser irradiation.

It is another object of the invention to produce an arrangement for machining workpieces wherein the laser intensity is modulated by a time-constant pulse form and a time-constant pulse interval and wherein the peak intensity of the laser irradiation and the time-constants of the modulation can be adapted to the processes in the machining zone of the workpiece.

It is a further object of the invention to provide an arrangement for machining workpieces wherein a diagnostic device is used for the sensing of threshold values as a function of the absorption condition of a workpiece machined by means of a laser beam and for the approximation of the laser intensity $I_L$ to the upper threshold value $I_D$.

It is another object of the invention to provide an arrangement for the machining workpieces wherein:

(a) a central unit is provided that is used for the control of the laser irradiation with respect to intensity, pulse duration and pulse interval according to a material-specific and machining specific process diagram as well for the control of the laser lens system corresponding to the desired geometry of the machining;

(b) a measuring device that is used for the continuous determination of the actual value of the intensity of the laser irradiation as well as its local and chronological distribution and for transmitting these measured data to the central unit;

(c) a diagnostic device is provided that is used for the continuous sensing of the processes in the machining zone of the workpiece and for transmitting the sensed data to the central unit;

(d) the central unit is constructed so that it compares the transmitted data with respectively pertaining desired values and eliminates possible deviations by the corresponding adjustment of the resonator adjusting means and the supply device of the laser.

It still another object of the invention to provide an arrangement for machining workpieces having a central unit constructed in such a way that it controls the intensity of the laser irradiation $I_L$ first to a value $I_C$ at which the product ($I_C \cdot dt/\sigma$) ($\sigma$=the characteristic penetration depth of the temperature front) reaches the critical energy for the production of a surface plasma having the impact frequency $\nu_C$ according to the condition $2\nu_C = \omega_L$, and will then let it pulsate between the critical values $I_C$ and $I_D$ in which case the pulse interval is selected to be such that the optical effect of the plasma in each case has dampened because of its expansion and the pulse duration is modulated in such a way that no complete absorption of the laser irradiation in the plasma can take place.

It is another object of the invention to provide an arrangement for machining workpieces wherein, for the sensing of the absorption condition of the workpiece, a device is provided for measuring of the irradiation intensity reflected by the workpiece.

It is yet another object of the invention to provide an arrangement for machining workpieces wherein, for the sensing of the approaching of the laser intensity $I_L$ to the critical value $I_D$ at least one of the following devices is provided:

(a) a device for measuring the intensity of the plasma luminance at an indicated distance from the workpiece;

(b) a device for the spectrally exploded measuring of the plasma brightness;

(c) a device for measuring the color temperature of the total radiant intensity of the plasma;

(d) a device for measuring the light scatter at the plasma;

(e) a device for measuring the detonation speed of the plasma;

(f) a device for measuring frequency shifts that are caused by the movement of the detonation front of the plasma;

(g) a device for measuring the acoustic signal caused by the plasma detonation wave.

It is another object of the invention to provide an arrangement for machining workpieces wherein a gas laser, preferably $CO_2$-laser is provided that is excited with high frequency.

The advantages of the invention are mainly that the arrangement according to the invention for the machining of workpieces by means of laser beams makes possible an adaptation of the laser emission to the respective dynamics of the machining process. By means of the arrangement according to the invention, other advantages can be achieved, especially an optimum in regard to quality, reproduceability, speed and geometry of machining with a maximal efficiency and minimal heating of the workpiece.

The foregoing objects, features and advantages of the present invention will become more apparent from the following description when taken in connection with the accompanying drawings which show, for the purposes of illustration only, one embodiment in accordance with the present invention, and wherein.

Figure 1:
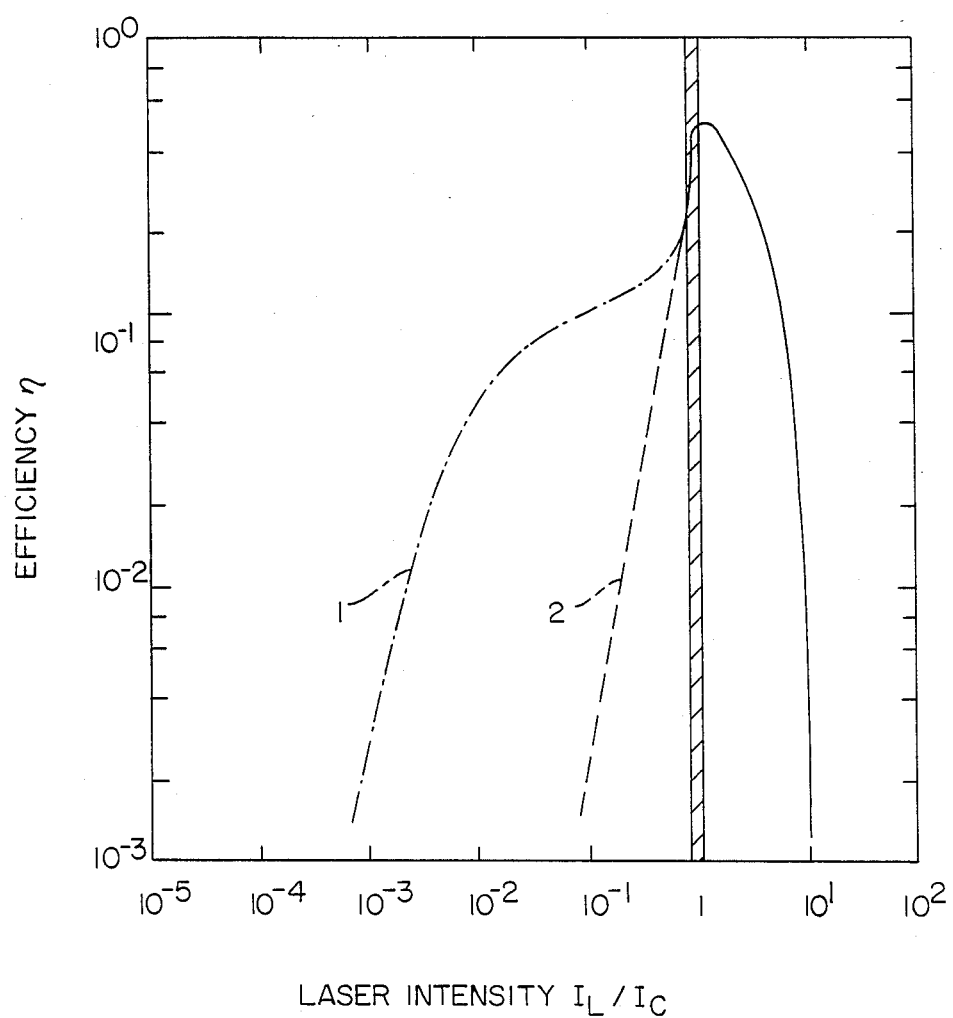
FIG. 1 is a diagram of the efficiency $\eta$ of a removing machining by means of a laser beam as a function of the relative laser intensity $I_L/I_C$.

Referring now to the drawings wherein like reference numerals are used to designate like parts and more particularly to FIG. 1, the efficiency $\eta$ of a removing machining is shown as a function of the relative laser intensity $I_L/I_C$ in the case of a wave length $\lambda = 10.6$ $\mu$m, namely for rustproof steel (Curve 1) as well as for cooper (Curve 2). It is found that in the range of the critical intensity $I_C$, the efficiency $\eta$ comes close to the value 1.

PREFERRED METHOD AND APPARATUS FOR THE INVENTION

Figure 2:
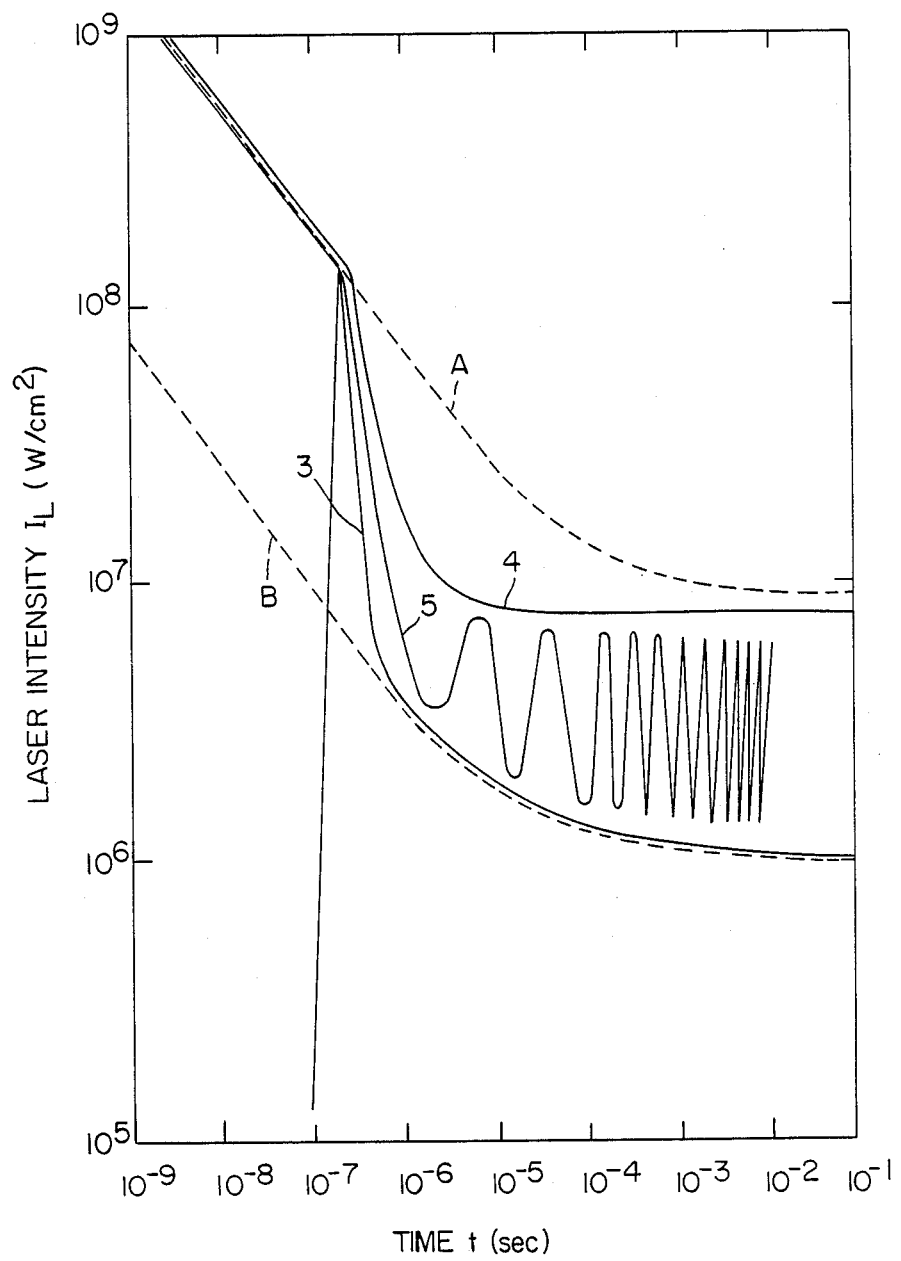
FIG. 2 is a process diagram for the machining of workpieces by means of laser beams.

The processes of the formation of plasma at the surface of the workpiece, especially the time-related development of the parameters that are important for the absorption of the laser irradiation, such as electron density, electron energy and impact frequency, may, under idealized conditions, be calculated quantitatively from balanced equations. A process diagram obtained from calculations of this type is shown in FIG. 2 for the machining of aluminum with $CO_2$—laser irradiation. The obtained Curves A and B represent the critical intensity $I_C$ for the formation of a laser-induced plasma, the production of which is sought in order to obtain an efficiency of the coupling-in of energy of a magnitude of 1. In this case, the Curve A is based on the natural degree of absorption A nat, and Curve B is based on the abnormal absorption $A \approx 1$.

During the machining process, a transition takes place from Curve A into Curve B, as shown by the Curve 3. Curve 4 shows the critical intensity $I_D$ for the formation of a shielding plasma that leads to the development of laser-induced detonation waves and largely interrupts the effect of the laser irradiation on the workpiece. With the knowledge of the development, as far as time is concerned, of the plasma characteristics, it is possible under the mentioned idealized conditions to establish such a process diagram for each material and each machining process, from which the time-related controlling of the laser intensity can be derived for optimal machining. This chronological controlling of the laser intensity is characterized by typical frequencies of the melt dynamics and plasma dynamics. Conventional machining processes do not take into account the dynamic behavior of the coupling-in and shielding plasma processes and therefore do not lead to optimal machining results. The uniqueness of the laser machining arrangement according to the invention comprises the adaptation of the laser emission to the respective dynamics of the machining process. Curve 5 in FIG. 2 indicates the chronological course of the laser intensity, as will be described in detail in the following.

The first step is the generating of the condition of increased absorption of the absorbing surface plasma. For this purpose, the laser intensity $I_L$ must reach the Curve A in FIG. 2, in which case the expression $(I_C \cdot dt/\delta) > \epsilon_V$ reaches the critical energy for the production of a surface plasma with an impact frequency $v_C$ of the magnitude of the laser frequency $v_L$ according to the condition $2 \cdot v_C = v_L$ ($\delta$ = characteristic penetration depth of the temperature front; $\epsilon_V$ = energy density required for the evaporation of the material).

As soon as the surface plasma exists under the conditions described, the laser intensity must be lowered rapidly so that the Curve 4 is not exceeded. If the curve 4 were exceeded, shielding of the workpiece by a laser-induced detonation wave with all its undesirable effects would occur.

The overheated plasma, with a speed that is under the detonation value, expands until the electron density has decreased to a value that no longer exhibits any interfering optical effect on the laser irradiation. The corresponding time constant $t = L_P/v$ is essentially determined by the expansion speed v of the plasma and its expansion length $L_P \approx 5 \cdot r_F$ ($r_F$ = focus radius).

After the time t, the laser intensity must be increased again but not beyond the Curve 4. The pulse duration must be selected to be such that the heated plasma volume dV expands with the desired kinetic energy $p/2 \, v^2$ dV. In the operation which ensues the laser intensity is within the limits $I_C \leq I_L < I_D$ and the pulse time constant is adapted to the plasma dynamics.

Depending on the machining process and the material to be machined, the chronological behavior and the absolute value of the threshold values $I_C$ and $I_D$ (Curves 3 and 4) will vary. The causes are the different transport and dissipation processes in the case of the respective machining process and varying characteristics of the workpiece materials with respect to heat conduction and absorption of the laser irradiation. Consequently, an individual process diagram is obtained for each material and for each machining process.

The process diagram according to FIG. 2 shows that for a reproduceable machining that is free of interference, with a high efficiency, the laser intensity must be controlled precisely according to the characteristics of the plasma. Intensity, pulse duration and pulse interval can be obtained from the process diagram. In addition, the process diagram also contains the following data that are not shown here: material, type of machining, wave length of the laser irradiation (for example, $\lambda = 10.6 \, \mu m$) and focus radius (for example, $r_F = 100 \, \mu m$).

In individual cases, by a machining by means having a fixed control of the laser irradiation that is determined and fixed in this way, an adaptation of the laser parameters to the workpiece dynamics can take place and the machining result can therefore be improved.

Figure 3A:
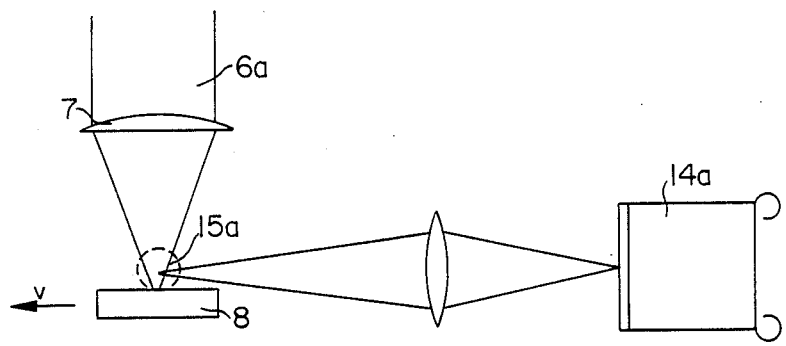
FIG. 3A shows an apparatus configuration.
Figure 3B:
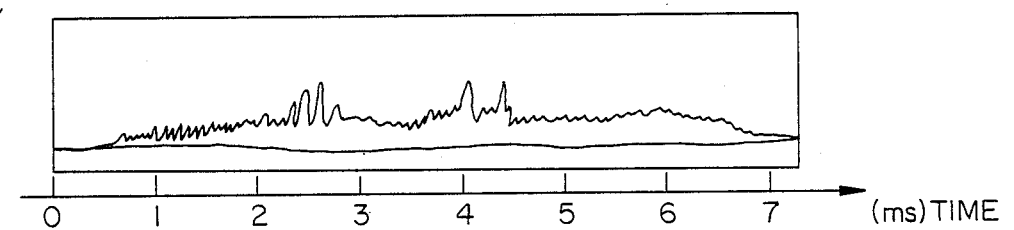
FIG. 3B shows streak photographs of the critical intensities $I_C$ and $I_D$ of the laser beam taking into account the stochastically influenced processes during the machining.
Figure 3B:
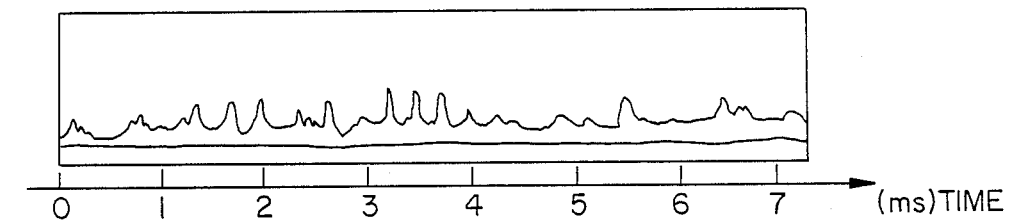
Figure 3B:
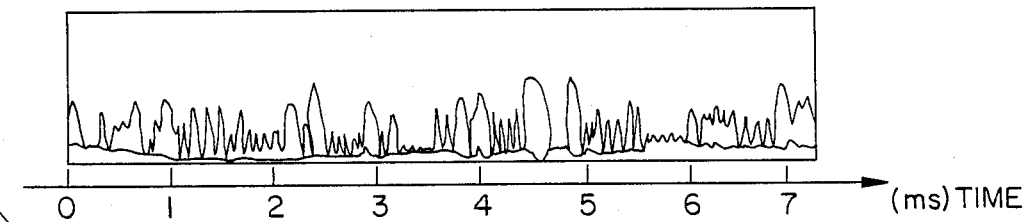

However, generally a high-quality machining is not possible according to such a fixed process requirement. The Curves 3 and 4 for the critical intensities $I_C$ and $I_D$ are subject to stochastic changes by the plasma and melt dynamics. As an example, in FIG. 3A, the welding of steel with $CO_2$ laser irradiation is shown wherein a laser beam 6a is focussed by lens 7 on workpiece 8 with a high speed camera 14a recording the nature of plasma 15a, and in FIG. 3B, the process is shown in the form of streak photographs. The pictures show the random character of the machining process. In addition, as mentioned above, the laser intensity is subjected to stochastic changes by optical reactions.

Because of the always existing non-uniformities of the material and other disturbing influences, it is not sufficient for an optimal machining of the workpiece to control the laser intensity without further measures corresponding to the course of the Curve 5 in FIG. 2. In contrast, according to the invention, during the machining of the workpiece, the laser emission, while continuously recording and taking into account the processes in the machining zone of the workpiece, by means of a corresponding modulation of the laser irradiation must be controlled in such a way that the laser intensity $I_L$ is kept in the range $I_C \leq I_L < I_D$. In this way, a maximal absorption of the laser irradiation can be achieved in the workpiece with minimal interference by optical feedback and plasma, as well as an optimal reproduceablity of the machining process. An arrangement for carrying-out the process according to the invention is described further below.

In a further development of the invention, the arrangement according to the invention has an apparatus comprising the following characteristics:

a central unit that is used for the controlling of the laser irradiation with respect to intensity, capacity, pulse duration and pulse interval as well as for controlling the laser optics corresponding to the desired geometry of the machining;

a measuring device for the continuous determination of the actual value of the intensity of the laser irradiation as well of its local and chronological distribution and for the transmitting of these measured data to the central unit;

a diagnostic device for the continuous recording of the processes in the machining zone of the workpiece and for the transmitting of the recorded data to the central unit;

the central unit being constructed in such a way that it compares the transmitted data with respective pertaining desired values and eliminates possible deviations by a corresponding adjusting of the resonator adjusting means and of the supply apparatus of the laser.

Figure 4:
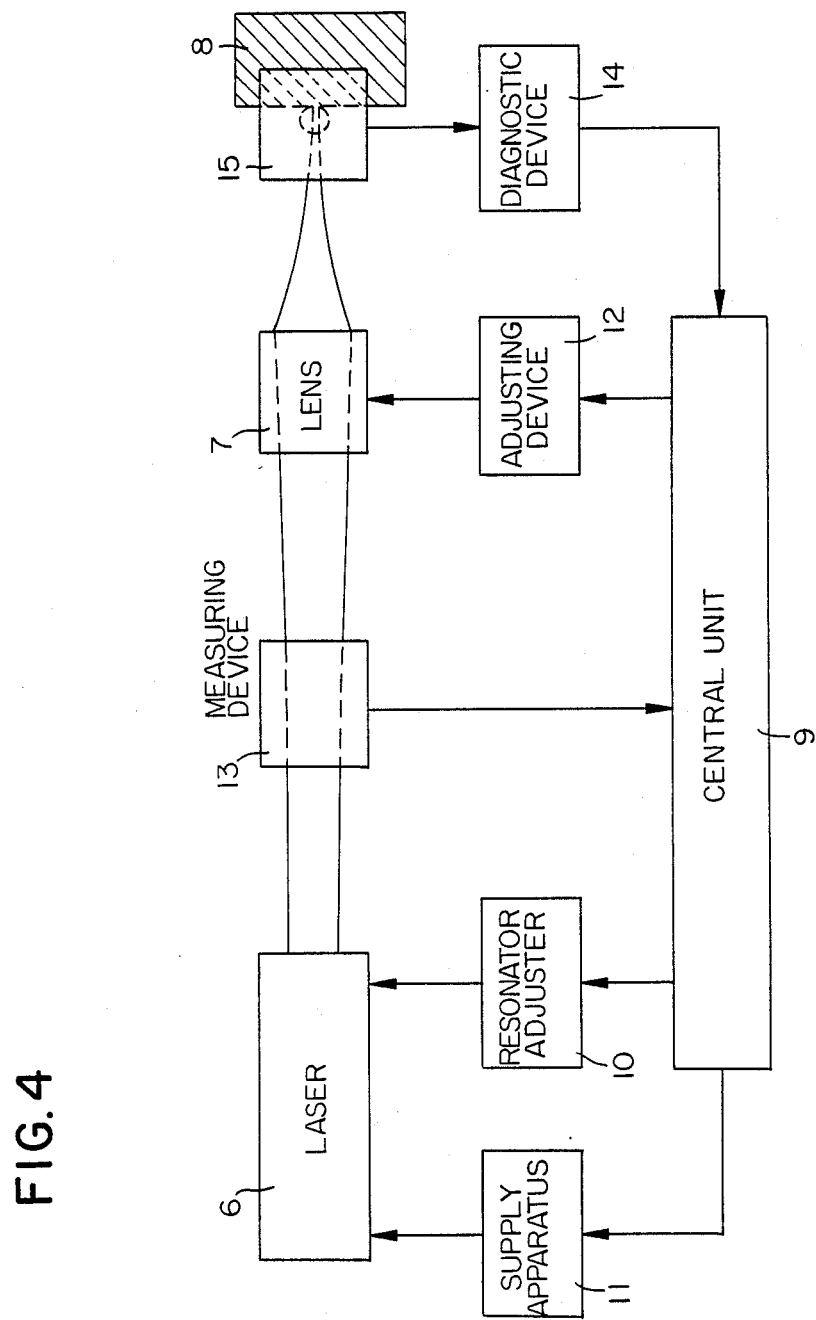
FIG. 4 is a diagrammatic representation of an embodiment of the arrangement according to the invention.

An embodiment of the device according to the invention is shown in diagram form in FIG. 4 and is described in the as follows:

A laser has the reference number 6, the irradiation of which, by means of a lens system 7, is focussed on a workpiece 8. A central unit 9, via the resonator adjusting means 10 and the supply apparatus 11 of the laser 6, controls the laser irradiation with respect to intensity, capacity, pulse duration and pulse interval. In addition, the central unit 9, via an adjusting device 12, controls the lens system 7 corresponding to the desired geometry of the machining. A measuring device 13 continuously determines the actual value of the intensity of the laser irradiation as well as its local and chronological distribution and transmits these measured data to the central unit 9. A diagnostic device 14 constantly senses the processes in the machining zone 15 of the workpiece 8 and also transmits the sensed data to the central unit 9. These measured data characterize the respective machining condition. When the laser intensity approaches the critical intensities $I_C$ or $I_D$, these measured values will exceed or fall below the indicated threshold values.

In the central unit 9, the measured values are compared with indicated threshold values. When the threshold values of the measured signal are exceeded or have fallen below the threshold values, the laser parameters are changed so that the measured value will again be between the indicated threshold values. Thus it is ensured that the laser intensity will not leave the area between the critical intensities $I_C$ and $I_D$.

For the sensing of the measured data, a large number of diagnostic methods may be used. For each method, the above-mentioned threshold values of the measured signal must be determined beforehand. This takes place, for example, by the gauging of machining conditions prepared in a defined way or by means of quality control of the machining result.

Among other things, the following measuring methods may be used for this purpose:

(a) measuring the intensity of the plasma luminance at an indicated distance from the workpiece;

(b) spectrally exploded measuring of the plasma brightness;

(c) measuring the color temperature or the total radiant intensity of the plasma;

(d) measuring the light scatter at the plasma;

(e) measuring the detonation speed of the plasma;

(f) measuring the frequency shifts caused by the movement of the detonation front of the plasma;

(g) measuring of the acoustic signal caused by the plasma detonation wave;

(h) measuring of the absorption condition of the workpiece perhaps by measuring the irradiation intensity reflected by the workpiece.

According to a further development of the invention, as the laser 6, because of its good modulating characteristics, a gas laser is used that is excited with high frequency, preferably a $CO_2$-laser. Use of other laser types (solid-state lasers) is possible.

The arrangement according to the invention for the machining of workpieces by means of laser beams is used, for example, for the removing machining of steel and copper but also for the welding of metallic materials. Any suitable material may be used for the machining. The mentioned types of machining are mentioned only as examples and may at any time be expanded to other types of machining.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A method for machining workpieces in a machining zone by means of a laser beam wherein $I_L$ = laser intensity value, $I_C$ = lower laser intensity value where abnormal absorption $\simeq 1$, $I_D$ = critical upper limiting laser intensity value, at which shielding of the workpiece by a plasma is almost complete comprising the steps of building up a plasma in the machining zone of the workpiece, continuously sensing stochastically influenced processes taking place in the machining zone by measuring the intensity of a plasma luminance at a predetermined distance from the workpiece and modulating laser irradiation in response to said sensing so that the range of value for $I_L$ satisfies the relation:

$$I_C \leq I_L < I_D.$$

2. A method in accordance with claim 1, wherein the step of modulating comprises modulating $I_L$ by means of a time-constant pulse form and a time-constant pulse interval to control peak intensity of laser irradiation and said time-constant pulse form and time-constant in response to sensing said processes in the machining zone of the workpiece.

3. A method in accordance with claim 1, wherein said sensing step further comprises sensing said stochastically influenced processes as a function of the absorption condition of said workpiece for approximating laser intensity $I_L$ in relation to the upper threshold value $I_D$.

4. A method in accordance with claim 1, further comprising the step of measuring continuously the actual value of the intensity of the laser irradiation, and wherein said step of modulating laser irradiation proceeds in response to said measuring of the actual value of the intensity of the laser irradiation.

5. A method in accordance with claim 1, wherein said sensing step further comprises measuring one of color temperature and total radiant intensity of plasma.

6. A method in accordance with claim 1, wherein said sensing step further comprises measuring light scatter at a plasma.

7. A method in accordance with claim 1, wherein said sensing step further comprises measuring an acoustic signal caused by a plasma detonation wave.

8. A method in accordance with claim 1, further comprising the step of lasing $CO_2$ gas at high frequency to generate said laser beam.

9. A method for machining workpieces in a machining zone by means of a laser beam wherein $I_L$ = laser intensity value, $I_C$ = lower laser intensity value where abnormal absorption $\simeq 1$, $I_D$ = critical upper limiting laser intensity value, at which shielding of the workpiece by a plasma is almost complete comprising the steps of building up a plasma in the machining zone of the workpiece, continuously sensing stochastically influenced processes taking place in the machining zone by spectrally measuring plasma brightness and modulating laser irradiation in response to said sensing so that the range of value for $I_L$ satisfies the relation:

$$I_C \leq I_L < I_D.$$

10. A method for machining workpieces in a machining zone by means of a laser beam wherein $I_L$ = laser intensity value, $I_C$ = lower laser intensity value where abnormal absorption $\simeq 1$, $I_D$ = critical upper limiting laser intensity value, at which shielding of the workpiece by a plasma is almost complete comprising the steps of building up a plasma in the machining zone of the workpiece, continuously sensing stochastically influenced processes taking place in the machining zone measuring detonations speed of a plasma and modulating laser irradiation in response to said sensing so that the range of value for $I_L$ satisfies the relation:

$I_C \leq I_L < I_D$.

11. A method for machining workpieces in a machining zone by means of a laser beam wherein
$I_L$ = laser intensity value,
$I_C$ = lower laser intensity value where abnormal absorption $\simeq 1$,
$I_D$ = critical upper limiting laser intensity value, at which shielding of the workpiece by a plasma is almost complete comprising the steps of building up a plasma in the machining zone of the workpiece, continuously sensing stochastically influenced processes taking place in the machining zone by measuring frequency shift caused by movement of a detonation front of a plasma, and modulating laser irradiation in response to said sensing so that the range of value for $I_L$ satisfies the relation:

$I_C \leq I_L < I_D$.

* * * * *